No. 797,830.  
PATENTED AUG. 22, 1905.  
C. WRIGHT.  
HOSE RACK.  
APPLICATION FILED AUG. 1, 1904.
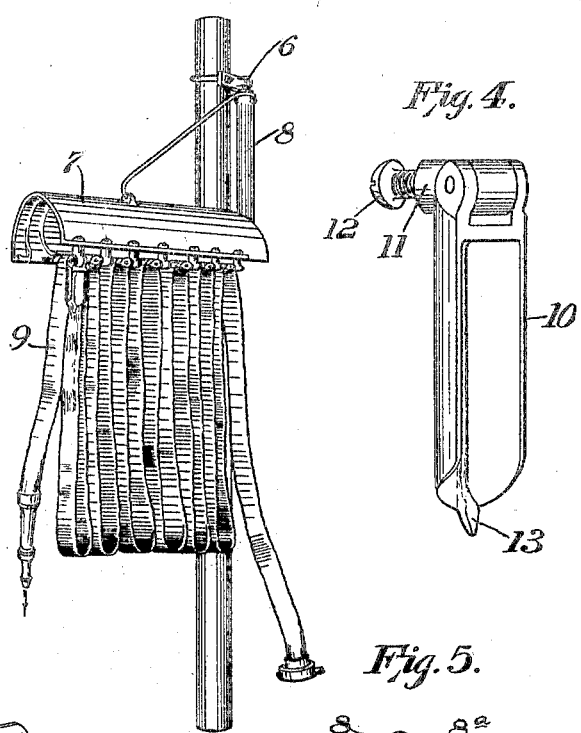
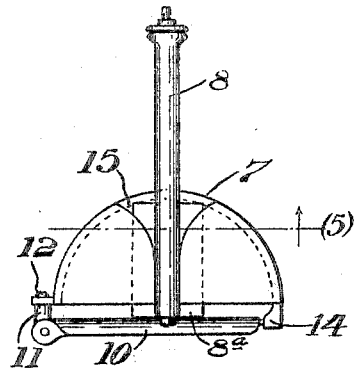
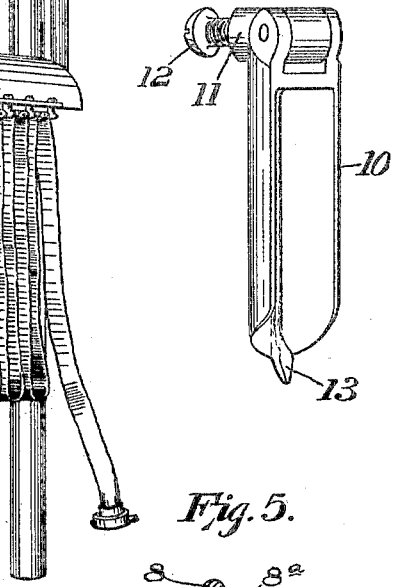
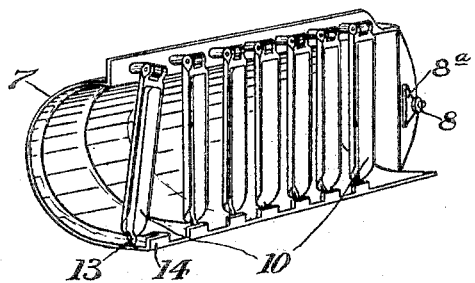
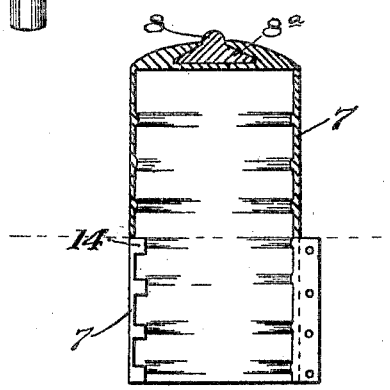
Witnesses;  
Cyril C. Crick  
A. Martin
Inventor,  
Charles Wright  
per Paul Synnestvedt  
Atty.

UNITED STATES PATENT OFFICE.

CHARLES WRIGHT, OF EVERSON, PENNSYLVANIA, ASSIGNOR TO WRIGHT MANUFACTURING COMPANY, OF WILKINSBURG STATION, PITTSBURG, PENNSYLVANIA, A CORPORATION OF PENNSYLVANIA.

HOSE-RACK.

No. 797,830.      Specification of Letters Patent.      Patented Aug. 22, 1905.

Application filed August 1, 1904. Serial No. 219,009.

*To all whom it may concern:*

Be it known that I, CHARLES WRIGHT, a citizen of the United States, residing at Everson, in the county of Fayette and State of Pennsylvania, have invented certain new and useful Improvements in Hose-Racks, of which the following is a specification.

My invention relates to supports for holding fire hose and the like when not in use, and its principal objects are to provide a hose rack by which the hose is conveniently suspended in readiness for use and is easily removed from its support; to provide a hose rack in which the act of pulling on the end of the hose will automatically release it from its suspending support in orderly shape; to provide separate supports for several folds of a hose which will automatically release one fold at a time when subjected to a pull, and to generally improve the structure and operation of hose racks. These objects, and other advantages which will hereinafter appear, I attain by means of the construction illustrated in preferred form in the accompanying drawings, wherein—

Figure 1 is a perspective view of the rack with the hose in place hanging thereon, shown as attached to an upright post.

Figure 2 is a perspective view showing the underside of the housing and rack;

Figure 3 is a rear end elevation showing the means of supporting the rack upon its swivel pin;

Figure 4 is a perspective view of the holder bar and its mounting, and

Figure 5 is a partial horizontal section on the line (5) of Figure 3 and a partial underplan view of the housing rack.

For a proper preservation of fire hose and the like when out of use, it is desirable that it be hung up in orderly form, and for quick and ready use in time of fire it is necessary that it be removed rapidly from its place on the rack in perfect order and without requiring manipulation of the rack itself. To meet such requirements I have provided a horizontally extending housing or rack 7, which may conveniently be a casting, provided at its back end with a removable swivel post 8 as shown in Figure 3, attached to the housing 7 by sliding the dove-tailed extension 8ª into a slot 15 in the back of the housing or rack. The swivel post is held in upright position by any convenient form of strap and brackets attached to a post of a building as may be desired.

The hose 9 is hung upon the rack in a series of folds as shown in Figure 1, each fold at the top resting upon a cross bar 10 which at one end is pivoted with a pivoted stud 11 which is tapped in the end by the screw 12 and supported directly on the rim of the hood 7 as shown in Figure 2. The bar 10 may be made of the hollow form shown, for lightness, and is provided at its loose end with a projecting finger or catch 13 which when the bar 10 is crosswise in the housing 7 engages the seating lug 14. The bar thus has a double swivel movement sidewise and vertically and it will be observed that it may slide off the seat 14 readily when pulled in a direction longitudinal with the length of the rack.

It will be observed from this construction that when the fireman seizes the front end of the hose and runs with it the separate loops of the hose will be drawn forth in such a direction as to swing the bars 10 around as shown in Figure 2, releasing the fingers 13 from the supporting lugs 14 and allowing the bars to successively drop downward as shown in Figure 1 and release the folds of the hose. The entire hose may thus be readily drawn off and each loop is released from its support in turn and in regular order. In replacing the hose it is merely necessary to form the loops and swing the bar 10 and engage the finger 13 with the catch 14 as will readily be understood. Various advantages of these improvements will readily occur to those familiar with the use of such devices.

Having thus described my invention and illustrated its use, what I claim as new, and desire to secure by Letters Patent, is the following:

1. The combination with a supporting rack, of a series of bars each attached thereto by a universal joint at one end and loosely engaging the rack at the other end, substantially as described.

2. In a hose rack the combination with a support therefor, of releasable supporting bars for loops of the hose, swiveled at one end and resting loosely upon the support at the other end, whereby the sidewise swinging of the bars may automatically release them from their support, substantially as described.

3. A hose rack comprising a supporting rack and a series of bars for holding separate folds of the hose, swiveled at one end so as to swing both horizontally and vertically and means for supporting their other ends and releasing them by a pull upon the hose, substantially as described.

4. In a hose rack a supporting bar therefor attached to the rack at one end by a universal joint and at the other resting loosely upon a catch on the rack and capable of swinging sidewise to disengage the end of the bar from said catch, substantially as described.

5. In a hose rack a supporting bar provided at one end with a catch and at the other end pivoted on an upright post, said post being pivoted on the rack, and the rack having catches for loosely engaging the other end of the bar, substantially as described.

6. The combination with the housing or rack 7, of a removable post 8 and brackets for supporting the same in upright position, a series of pivoted swinging holder bars for the folds of the hose attached to said rack at one end for universal movement and resting loosely upon said bracket at the other end, whereby the sidewise swing of the bar may allow it to drop down to vertical position and release the hose.

7. In a hose rack a pivoted housing for supporting and protecting the hose comprising a covering member having brackets to support it in horizontal position and being provided with supporting ledges, in combination with a series of hinged bars removably supported upon said ledges, substantially as described.

In testimony whereof I have hereunder signed my name in the presence of the two subscribed witnesses.

CHARLES WRIGHT.

Witnesses:
J. L. MANSFIELD,
GEO. B. SHIELDS.